Oct. 17, 1961  W. F. NEWBOLD  3,005,164
DIRECT CURRENT AMPLIFIER FEEDBACK CONTROL CIRCUIT
Filed Feb. 7, 1956
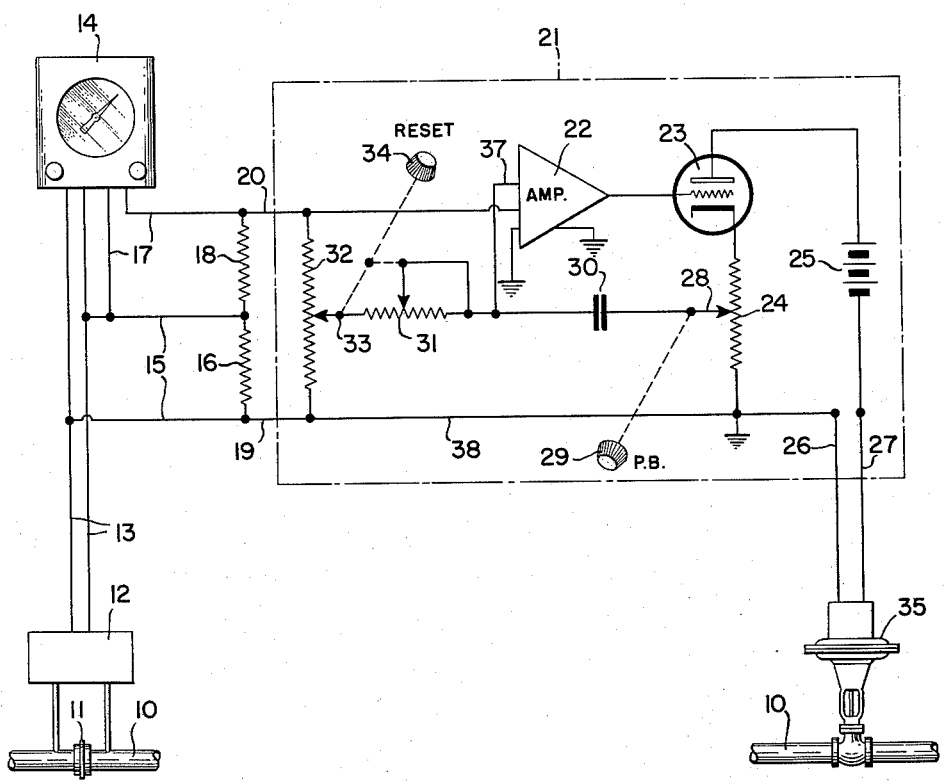
INVENTOR.
WILLIAM F. NEWBOLD
BY
ATTORNEY.

3,005,164
DIRECT CURRENT AMPLIFIER FEEDBACK
CONTROL CIRCUIT
William F. Newbold, Ambler, Pa., assignor to Minneapolis-Honeywell Regulator Company, Minneapolis, Minn., a corporation of Delaware
Filed Feb. 7, 1956, Ser. No. 563,903
6 Claims. (Cl. 330—108)

A general object of the present invention is to provide a new and improved electrical controller for use in regulating the magnitude of a controlled variable. More specifically, the invention is concerned with an improved electrical controller incorporating proportional and reset functions to provide a control signal to regulate the magnitude of a controlled variable so that the magnitude of the controlled variable will be maintained at the desired set point value.

A well known type of proportional process controller comprises a variable measuring device which produces an output signal proportional to the magnitude of the variable being controlled. This measured variable signal may well be compared with a set point signal to produce a further signal indicative of the deviation of the measured variable from the set point value. The deviation signal is applied to a controller which is operative to amplify the signal and to produce an output signal which may be used to control the operation of the device to regulate the magnitude of the controlled variable and thereby cause an adjustment in the measured variable to return it to the desired set point value. Controllers that are used in the configuration of the aforementioned type may well include both proportional and reset functions. The proportional function in the controller is used to determine the magnitude of the output signal with respect to the input signal. In other words, for a certain deviation signal, it is desired to apply a certain magnitude output control action to the measured variable as required to eliminate the deviation signal. The reset function serves to slowly change the output of the controller when there is a sustained deviation or a droop of the measured variable from the set point value, said deviation or droop being caused by some change in the system outside of the control such as a change in the load on the overall system.

The present invention is directed to an improved electrical signal controller for use in the aforementioned type of proportional control system wherein the electrical controller incorporates proportional and reset functions. The reset function is conveniently achieved in the present invention by the use of a resistor and a condenser connected to form an R-C differentiation network in the feedback loop of a direct current amplifier in the controller. This configuration will produce the desired integrating action in the forward loop of the controller so that a sustained deviation signal on the input of the controller will produce an output signal which slowly changes in a direction to eliminate the deviation.

The rate at which the reset action is effective is preferably adjustable and of sufficient time constant to prevent the overall system from being unstable. The time constant is determined primarily by the magnitude of the resistor and condenser used in the R-C differentiation network in the D.C. amplifier of the controller. The time constant that can conveniently be achieved in a commercially practical electrical controller is limited due to the fact that controllers of this type heretofore have required condensers and resistors of very large magnitude such that the leakage resistance of the elements may become an appreciable part of the resistance in the circuit. This condition is extremely undesirable as ambient conditions will tend to shift the desired reset action and thereby destroy the utility of the circuit. In accordance with the principles of the present invention, the time constant of the reset network may be increased by arranging the circuit so that if the gain of the amplifier is high, an alternating network on the input serves to increase the reset time. This allows the use of practical size resistance elements.

It is accordingly a more specific object of the present invention to provide a new and improved electrical controller incorporating a high gain amplifier and a reset network where the time constant thereof is readily adjustable by the adjustment of an alternating network on the input of the amplifier.

Still another more specific object of the present invention is to provide an improved electrical controller incorporating a reset function wherein the time constant of an R-C feedback differentiation network around a high gain direct current amplifier has a time constant which is readily increased by the adjustment of the resistance in the network to vary the input signal attenuation on the input of the amplifier.

A still further object of the present invention is to provide an improved electrical controller having a pair of input terminals and a pair of output terminals with a potentiometer connected across the input terminals and a further potentiometer connected in the circuit with the output terminals with a feedback connection including a condenser and a resistor connected between the sliders of the two potentiometers and wherein the amplifier of the controller has one input terminal connected directly to the junction point between the condenser and the resistor in the feedback connection.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Referring to the single figure, there is shown a representative process control apparatus which is applied to regulating the flow of a fluid through a conduit 10. While the present invention has been shown as applied to flow control, it is understood that it is applicable to any type of electrical control for regulating the magnitude of any desired measured variable. Positioned within the conduit 10 is an orifice 11 across which there will be a differential pressure drop dependent upon the rate at which the fluid within the conduit 10 is flowing. This differential pressure will be detected by a differential pressure transmitter 12 which may be of the type disclosed in my copending application Serial No. 391,207, filed November 10, 1953, now Patent No. 2,762,938, and is adapted to receive input signals from the differential pressure across the orifice 11 and produce an output unidirectional electrical signal on leads 13 which is proportional to the rate of flow through the conduit 10. The signal on the leads 13 are connected to supply an input signal to a suitable indicating and recording instrument 14. This signal is also applied by way of the leads 15 to a resistor 16 to produce thereacross a voltage proportional to the magnitude of the variable flow.

Indicating instrument 14 may well incorporate therein a set point signal source which is adapted to produce a unidirectional electrical signal of a magnitude proportional to the desired measured variable signal appearing upon the leads 15. The set point signal is applied to leads 17 and thereby across the resistor 18 to produce a voltage thereacross proportional to the desired set point value.

Electrical signals on the resistors 16 and 18 are in opposition so that if they are both of the same magnitude, there will be no input signal applied to the input leads 19 and 20 of a controller 21. The controller 21 comprises a direct current amplifier 22, and output amplifier 23, as well as proportional and reset adjusting components. The proportional function of the controller 21 is produced by a potentiometer 24 connected in series with the power amplifier tube 23 and a source of power 25. This potentiometer 24 is in series with the output leads 26 and 27 and has a slider 28 which is adjustable by the manual knob 29. The reset function of the controller is produced by an R-C network comprising a condenser 30, a variable resistor 31, and a potentiometer 32, the latter of which has a movable slider 33 which is interconnected with the slider of the adjustable resistor 31 so as to be simultaneously variable therewith. The knob 34 is used to adjust the potentiometer 32 on the resistor 31.

The output signal on leads 26 and 27 is shown connected to supply the control signal for an electro-pneumatic valve 35, the latter of which is connected in series with the conduit 10 to regulate the flow therethrough.

In considering the operation of the present apparatus, it should first be noted that the flow of the fluid flowing in the conduit 10 is detected and measured by the flow transmitter 12 which produces an output current proportional to the magnitude of the flow through the conduit 10. The signal on the output leads 13 is applied to the resistor 16 to produce thereacross a voltage proportional to the flow in conduit 10. At the same time, the set point source in the indicator 14 produces an output current on leads 17 which produces a voltage drop across a resistor 18. Any difference between the voltages across the resistors 16 and 18 result in an input voltage being produced on input leads 19 and 20 of the controller 21. The signal on input leads 19 and 20 will be amplified by the controller and there will be produced on the output leads 26 and 27 a signal which bears a predetermined proportional relationship to the input signal. The signal on the leads 26 and 27 is applied to the electro-pneumatic valve 35 and the valve is proportionally adjusted to produce a desired fluid flow through the conduit 10.

Considering the operation of the controller 21 more specifically, it should first be noted that the input signal on the input leads 19 and 20 is applied to the input of a direct current amplifier 22. This input signal is directly connected to the amplifier 22 by the lead 20 and indirectly connected to the amplifier 22 by the lead 19 through the lower portion of the potentiometer 32, resistor 31, to the other input terminal 37 of the amplifier 22. The output of the amplifier 22 is coupled directly to the input control electrode of the power amplifier tube 23. The current flowing in this power tube 23 will be directly dependent upon the magnitude of the voltage on the input control electrode. The current flowing in the output of the tube 23 may be traced from the positive terminal of the battery 25 through the tube 23, potentiometer 24, output leads 26 and 27, back to the negative terminal of the battery 25.

The proportional relationship between the input signal on input leads 19 and 20 and the output signal on leads 26 and 27 is determined by the setting of the slider 28 by the proportional band adjusting knob 29. For a particular setting of the slider 28, there will be a preselected feedback signal from the potentiometer 24 and this feedback signal may be traced through the condenser 30, to the input lead 37 of the amplifier 22. The feedback circuit is actually completed by way of the adjustable resistor 31, the slider 33, and the lower portion of the potentiometer 32 to the lead 38 which is common to the lower end of the potentiometer 32 and the lower end of the potentiometer 24. For a step input function on input terminals 19 and 20, the feedback action through the condenser 30 to the input lead 37 will likewise be a step function. This feedback is degenerative and will tend to reduce the actual input voltage to the amplifier 22 to zero. If the step input function is retained on the input terminals 19 and 20 for a period of time, the condenser 30 will begin to charge to thereby decrease the amount of feedback voltage available at the input lead 37. This can be overcome only by the output of the amplifier 22 increasing and causing a corresponding increase in the signal from the output tube 23. Thus, as the output of the tube 23 increases there will be an increased amount of signal available at the slider 28 which will be fed back to eliminate the unbalance on the input of the amplifier 22. This action is actually a continuous action and the output of the tube 23 will increase at a rate dependent upon the rate at which the condenser 30 charges.

The rate at which the reset condenser 30 charges will be a function of the magnitude of the resistance in the charging circuit for the condenser. This resistance magnitude will be dependent upon the adjustment of the adjustable resistor 31 and the amount of resistance of the potentiometer 32 between the slider 33 and the lower terminal thereof connected to the lead 38. It will be noted that the input signal on the leads 19 and 20 will pass through the potentiometer 32. It will also be noted that the feedback current on the slider 28 passes through the resistor 31. The polarity of the feedback signal on resistor 31 is in opposition to the input signal on the upper portion of resistor 32 and tends to cancel the same so that there is a net input voltage of zero in the amplifier 22. The time constant of the reset network is determined by the setting of the slider 33 on potentiometer 32. If the slider 33 is positioned at the lower end of potentiometer 32, the time constant of the circuit will be low. This results from the fact that the amount of feedback current signal through resistor 31 must be flowing at a high rate in order to balance the input signal appearing on the potentiometer 32 between the slider 33 and the input terminal 20. This high current can be achieved only by the condenser 30 charging at a fast rate. Should the slider 33 be set toward the top of potentiometer 32, the reset rate will be slow. This will be apparent when it is noted that the feedabck signal on resistor 31 is required to balance only a small signal on the upper portion of potentiometer 32. Thus, the condenser 30 need only charge at a very slow rate in order for there to be a signal balance on the input of amplifier 22. This permits the selection of R-C components in the reset network which are of a magnitude which are commercially practical and not subject to drift due to changing ambient conditions.

The resistance in the reset network, when adjusted by the knob 34, is adjusted simultaneously in the potentiometer 32 and the resistor 31. This configuration permits a wide range of reset rate adjustment and thereby increases the flexibility of the selection of the reset timing of the controller 21.

While, in accordance with the provisions of the statutes, there has been illustrated and described the best forms of the embodiments of the invention known, it will be apparent to those skilled in the art that changes may be made in the form of the apparatus disclosed without departing from the spirit of the invention as set forth in the appended claims, and that in some cases certain features of the invention may be used to advantage without a corresponding use of other features.

Having now described the invention, what is claimed as new and for which it is desired to secure by Letters Patent is:

1. An electrical controller having a pair of input terminals and a pair of output terminals and comprising a direct current amplifier connected between said controller input and output terminals, a first potentiometer resistor connected across said input terminals and having a slider, a second potentiometer connected to said output terminals and having a slider, a feedback connection between the sliders of said first and second potentiometers, a condenser and a resistor connected in series in said feedback connection, a connection between an input terminal of said direct current amplifier and the junction point between said condenser and said resistor, and a further connection between another input terminal of said amplifier and one of said controller input terminals.

2. An electrical controller having a pair of input terminals and a pair of output terminals and comprising a direct current amplifier, said amplifier having a pair of input terminals and a pair of output terminals, a first potentiometer resistor connected across said controller input terminals and having a slider, a second potentiometer connected to said controller output terminals and said amplifier output terminals and having a slider, a feedback connection between the sliders of said first and second potentiometers, a condenser in series in said feedback connection, a resistor connected in series with said condenser, a connection between one input terminal of said direct current amplifier and the junction point between said condenser and said resistor, and a further connection between another input terminal of said amplifier and one of said controller input terminals.

3. An electrical controller having a pair of input terminals and a pair of output terminals and comprising a direct current amplifier connected between said controller input and output terminals, said amplifier having a pair of input terminals and an output terminal, a first potentiometer resistor connected across said controller input terminals and having a slider, a second potentiometer connected to said controller output terminals and said amplifier output terminal, and having a slider, a feedback connection between the sliders of said first and second potentiometers, a condenser connected in series in said feedback connection, a resistor connected in series with said condenser, a connection between one input terminal of said direct current amplifier and the junction point between said condenser and said resistor, a further connection between the other input terminal of said amplifier and one of said controller input terminals, and means for simultaneously adjusting the magnitude of said resistor and the position of the slider of said first potentiometer.

4. An electrical controller incorporating proportional and reset functions comprising a pair of input terminals, a pair of output terminals, a tapped potential divider connected across said input terminals, a second tapped potential divider connected to said output terminals, a direct current amplifier having a pair of input terminals and connected between said controller input and output terminals, a feedback connection between the tap of said second divider and one input terminal of said amplifier, a condenser connected in series in said last named connection, a resistor, means connecting said resistor between the tap of said first divider and said one input terminal of said amplifier, and means connecting the other input terminal of said amplifier to one of said controller input terminals.

5. An electrical controller incorporating proportional and reset functions comprising a pair of input terminals, a pair of output terminals, a first potentiometer connected across said input terminals and having a slider, a second potentiometer connected to said output terminals and having a slider, a direct current amplifier having a pair of input terminals and connected between said controller input and output terminals, a feedback connection between the slider of said second potentiometer and one input terminal of said amplifier, a condenser connected in series in said last named connection, an adjustable resistor, means connecting said resistor between the slider of said first potentiometer and said one input terminal of said amplifier, means connecting the other input terminal of said amplifier to one of said controller input terminals, and adjusting means connected to said adjustable resistor and said slider of said first potentiometer.

6. An electrical controller incorporating proportional and reset functions comprising a pair of input terminals, a pair of output terminals, a reset potentiometer connected across said input terminals and having a slider, a proportional band potentiometer connected to said output terminals and having a slider, a direct current amplifier having a pair of input terminals and connected between said controller input and output terminals, a feedback connection between the slider of said proportional band potentiometer and one input terminal of said amplifier, a condenser connected in series in said last named connection, means connecting the slider of said reset potentiometer to said one input terminal of said amplifier, and means connecting the other input terminal of said amplifier to one of said controller input terminals.

References Cited in the file of this patent

UNITED STATES PATENTS

| | | |
|---|---|---|
| 2,587,313 | Grundmann | Feb. 26, 1952 |
| 2,605,409 | Forbes | July 29, 1952 |
| 2,612,632 | Ayres et al. | Sept. 30, 1952 |
| 2,631,201 | Morrison | Mar. 10, 1953 |
| 2,666,815 | Chapin | Jan. 19, 1954 |
| 2,702,881 | Kubler | Feb. 22, 1955 |
| 2,749,441 | Kelly | June 5, 1956 |
| 2,762,965 | Walker | Sept. 11, 1956 |